United States Patent [19]

Hama et al.

[11] Patent Number: 4,779,197

[45] Date of Patent: Oct. 18, 1988

[54] THREE-PHASE-ENCLOSURE TYPE GAS INSULATED SWITCHGEAR

[75] Inventors: Hiroyuki Hama; Keizo Takatsuka, both of Amagasaki, Japan

[73] Assignee: Mitsubishi Denki Kabushiki Kaisha, Japan

[21] Appl. No.: 118,001

[22] Filed: Nov. 9, 1987

[30] Foreign Application Priority Data

Nov. 11, 1986 [JP] Japan .................... 61-266519

[51] Int. Cl.$^4$ .............................................. H02B 1/20
[52] U.S. Cl. .................... 361/341; 200/148 R; 200/148 B
[58] Field of Search ............... 200/148 B, 148 R; 361/341

[56] References Cited

U.S. PATENT DOCUMENTS

| 4,500,762 | 2/1985 | Yoshizumi | 200/144 AP |
| 4,535,383 | 8/1985 | Yamaoka et al. | 361/341 |
| 4,652,708 | 3/1987 | Okuno et al. | 200/146 R |
| 4,687,890 | 8/1987 | Yamamoto et al. | 200/148 B |
| 4,688,136 | 8/1987 | Yamauchi | 361/120 |

FOREIGN PATENT DOCUMENTS 55-98117 7/1980 Japan ........................ 361/341

Primary Examiner—Robert S. Macon
Attorney, Agent, or Firm—Leydig, Voit & Mayer

[57] ABSTRACT

A three-phase-enclosure type gas insulated switchgear in which high-voltage conductors in a metallic vessel are disposed in parallel to each other to pass through apexes of a substantially right angled equilateral triangle, and in which each of the high-voltage conductors is supported by a single pedestal type support insulator. The single pedestal type support insulator is mounted to the metallic vessel at an angle with respect to lines passing through the center of the metallic vessel and the center of each of the high-voltage conductors.

3 Claims, 4 Drawing Sheets

THREE-PHASE-ENCLOSURE TYPE GAS INSULATED SWITCHGEAR

BACKGROUND OF THE INVENTION

This invention relates to a three-phase-enclosure type gas insulated switchgear and particularly to a three-phase-enclosure type gas insulated switchgear in which the high-voltage conductors are insulatably supported by single pedestal type support insulators.

While a pedestal type support insulator for supporting a high-voltage conductor in a three-phase-enclosure type gas insulated switchgear generally includes single pedestal types, double pedestal types, triple pedestal types, etc, the single pedestal type support insulator is advantageous in view of its compactness, the reduction in weight, lower costs and the like.

FIGS. 6 and 7 illustrate a conventional three-phase-enclosure type gas insulated switchgear as disclosed for example in Japanese U.M. Laid-Open No. 55-98117, in which three high-voltage conductors 2 are contained within a metallic vessel 1 and an electrically insulating gas 3 is filled in the metallic vessel 1. The high-voltage conductors 2 are insulatably supported by single pedestal type support insulators 4.

As seen from FIGS. 6 and 7, the high-voltage conductors 2 are disposed in parallel to extend through the apexes of a right angled equilateral triangle, and the highvoltage conductors 2 are supported by the single pedestal type support insulators 4 which extend along the central axis of the metallic vessel 1 and in the radial direction of the metallic vessel 1. Generally, the optimum direction of support of the single pedestal type support insulator 4 in the three-phase-enclsoure type gas insulated switchgear is determined by taking into consideration the mechanical performance and the electrical performance. From the view point of mechanical performance, the support direction must be selected with the shortcircuit electromagnetic force upon a shortcircuit fault taken into consideration so that the bending moment acting on the single pedestal support insulator 4 is minized. Further, from the view point of electrical performance, the support direction must be determined so that the flashover distance along the single pedestal support insulator 4 is lengthened to improve the withstand voltage characteristics.

According to experiments and analysis thereof on the shortcircuiting electromagnetic forces in a three-phase-enclosure type gas insulated bus bar conducted by the inventors of the present invention, it has been determined that the magnitude and the direction of the maximum electromagnetic force changes according to the material of the metallic vessel 1. Therefore, the optimum support direction of the single pedestal type support insulator 4 in terms of mechanical performance is different according to the material of the metallic vessel 1.

In the conventional three-phase-enclosure type gas insulated switchgear as described above, since the single pedestal type support insulators are usually mounted in the radial direction as shown in FIG. 7 irrespective of the material of the metallic vessel, the mounting of the support insulators is not optimized in accordance with the material of the metallic vessel.

SUMMARY OF THE INVENTION

This invention has been made to solve the above problem and has as its object the provision of a three-phase-enclosure type gas insulated switchgear having a direction of support or the single pedestal support insulator optimized in accordance with the material of the metallic vessel.

The three-phase-enclosure type gas insulated switchgear according to the present invention is arranged such that the support angle defines a predetermined angle with respect to a line passing through the vessel center and the center of each high-voltage conductor. For example, the support angle ranges between about 20° and 55° for mild steel or stainless steel vessels, and the support angle is about 90° for an aluminum alloy vessel.

In the present invention, single pedestal type support insulators are mounted to the metallic vessel at a predetermined support angle, so that optimization of the mechanical performance and the electrical performance of the single pedestal type support insulator can be achieved.

BRIEF DESCRIPTION OF THE DRAWINGS

FIGS. 3 and 4 are diagrams illustrating models for analysis of the optimum support direction of the single pedestal type support insulator of the present invention, in which FIG. 3 is a cross-sectional view and FIG. 4 is a fragmental side view;

In the figures, the same reference numerals designate identical or corresponding components.

DETAILED DESCRIPTION OF THE PREFERRED EMBODIMENTS

Figure 3:
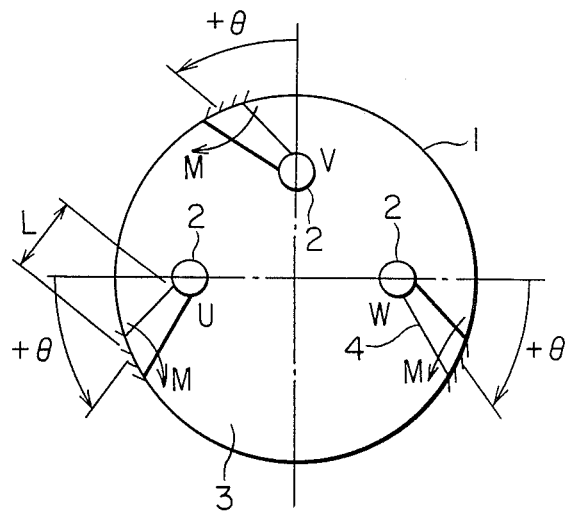
Figure 4:
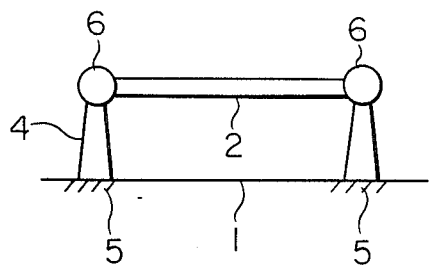
Figure 5:
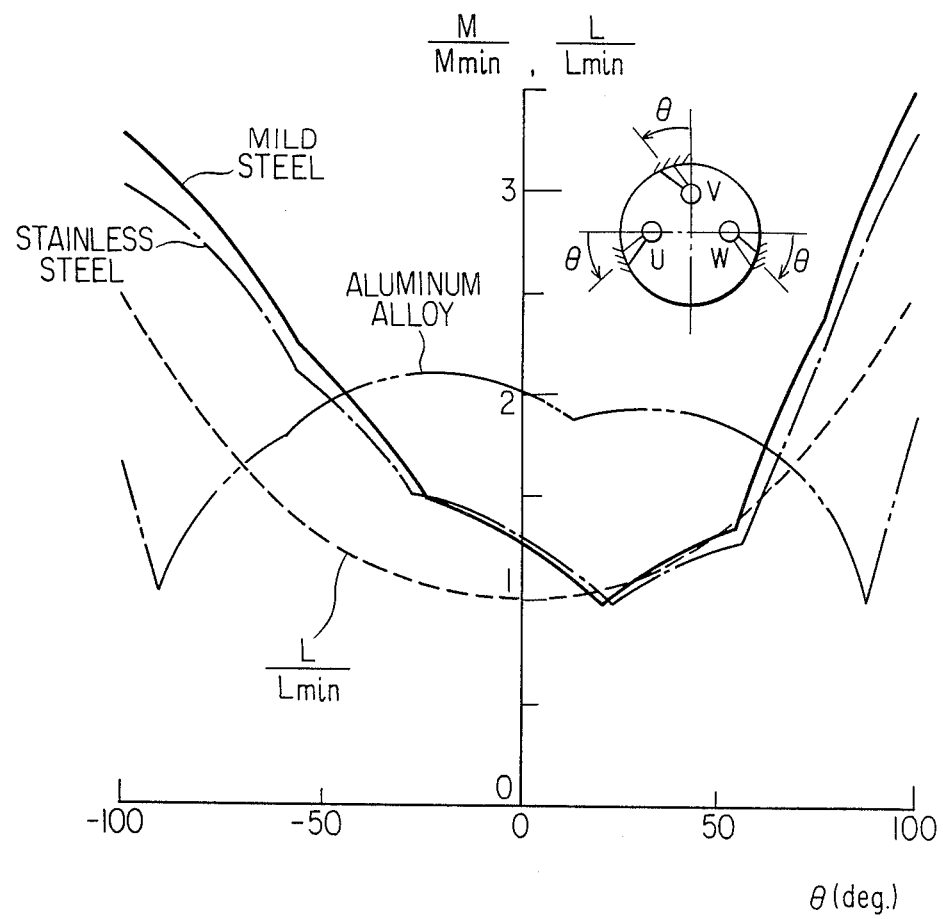
FIG. 5 is a characteristic diagram obtained by the analysis showing the dependency of the bending moment acting on the single pedestal type support insulator and the axial length (flashover surface length) upon the support angle.
Figure 6:
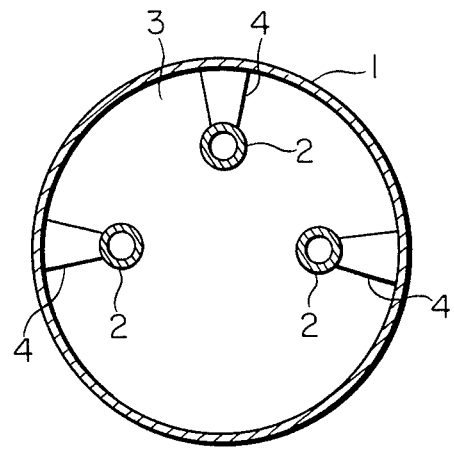
FIG. 6 is a fragmental sectional side view of a conventional three-phase-enclosure type gas insulated switchgear.
Figure 7:
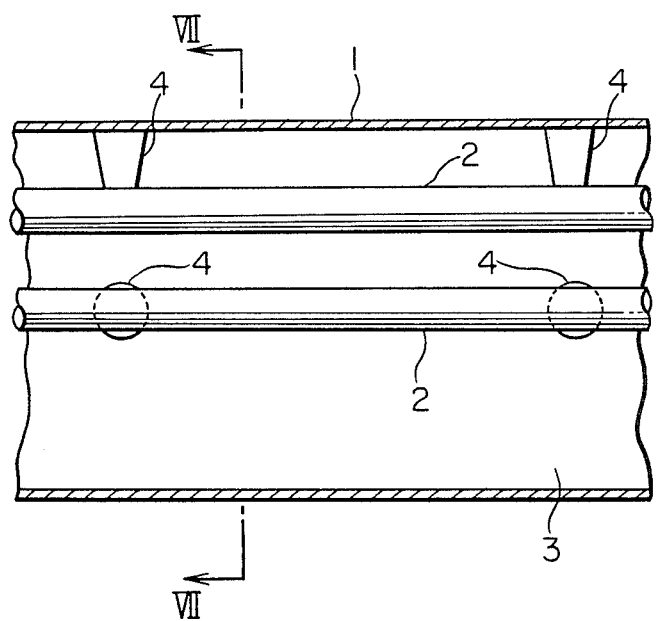
FIG. 7 is a sectional view along the line VII—VII of FIG. 6.

FIGS. 3 to 5 illustrate results of the analysis on the optimum support direction for the single pedestal type support insulator conducted by the inventors of the present invention. FIGS. 3 and 4 are views showing the analysis model used, in which the magnitude and the direction of the maximum electromagnetic forces acting on the high-voltage conductor 2 of the respective illustrated phases U, V and W are determined and where the bending moments M acting on the fixed ends 5 of the single pedestal type support insulators 4 on the inner surface of the metallic vessel 1 are determined by computation in terms of the illustrated support direction $\theta$ for the various metallic vessels 1 of mild steel, stainless steel, aluminum alloy, etc.

Also, the axial length (flashover surface length) L of the single pedestal type support insulator 4 is determined in terms of the support direction $\theta$.

In this analysis, the opposing ends 6 of the high-voltage conductor 2 are secured by the single pedestal type supprot insulators 4. FIG. 5 is a graph illustratrng the results of the above analysis, in which, for each of various metallic vessels 1 made of mild steel, stainless steel and aluminum alloy, the dependency of the bending moments M on the single pedestal type support insulator 4 and the axial length (flashover surface length) L on the support direction $\theta$. It is to be noted that the bending moment M and the axial length (flashover surface length) L are standardized by the respective minimum values Mmim. and Lmin.

According to the results of the experiments and analysis, the bending moment M in the case where a mild steel vessel is used is larger than the bending moment M in a stainless steel vessel by about 25%. Also, the bending moment M where an aluminum vessel is used is about 35% of the bending moment M for a steel vessel. In computing the bending moments M, three phase shortcircuiting, which is the most severe shortcircuit condition in an actual system, is taken into consideration.

As is apparent from FIG. 5, while the bending moment M acting on the single pedestal support insulator 4 when a mild steel vessel or a stainless steel vessel is used is at its minimum when the support angle $\theta$ is about 20°, the optimum support angle $\theta$ is within the range of about 20°–55° when the axial length (flashover surface length) L is taken into consideration. On the other hand, the bending moment M when an aluminum alloy vessel is used is at its minimum and the axial length (flashover surface length) L can be made long when the support angle $\theta$ is about ±90°, so that the optimum support angle $\theta$ is about ±90°.

Figure 1:
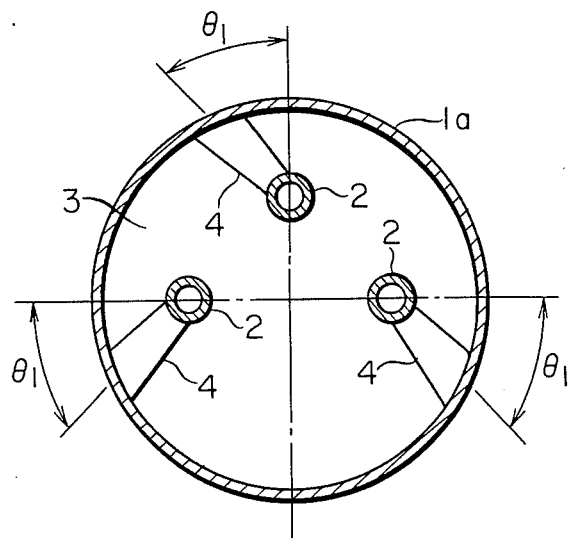
FIG. 1 is a cross sectional view of one embodiment of the present invention.

One embodiment of the present invention will now be described in conjunction with FIG. 1. FIG. 1 illustrates the embodiment in which a metallic vessel 1a made of mild steel or stainless steel is used, and the high-voltage conductors 2 are supported at the optimum support angle $\theta_1$ as illustrated by the single pedestal type support insulator 4. The support angle $\theta_1$ in this case is within the range of about 20°–55° as previously described.

Figure 2:
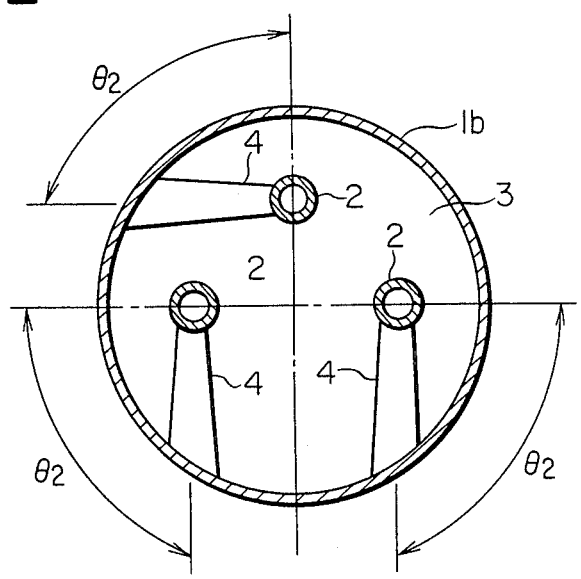
FIG. 2 is a cross sectional view of another embodiment of the present invention.

FIG. 2 illustrates another embodiment of the present invention in which an aluminum alloy vessel 1b is used, and in which the optimum support angle $\theta_2$ by the single pedestal type support insulators 4 is about 90° as previously described.

As has been described, according to the present invention, the mechanical performance and the electrical performance of the single pedestal type support insulator are optimized in accordance with the material of the metallic vessel, so that the three-phase-enclosure type equipment can be advantageously reduced in size and improved reliability and costs can be achieved.

What is claimed is:

1. A three-phase-enclosure type gas insulated switchgear in which high-voltage conductors in a metallic vessel are disposed in parallel to each other to pass through apexes of a substantially right angled equilateral triangle, and in which each of said high-voltage conductors is supported by a single pedestal type support insulator, said single pedestal type support insulator being mounted to said metallic vessel at an angle with respect to lines passing through the center of said metallic vessel and the center of each of said high-voltage conductors.

2. A three-phase-enclosure type gas insulated switchgear as claimed in claim 1, wherein said metallic vessel is made of one of mild steel and stainless steel, and the support angle of said single pedestal support insulator is within a range of from about 20° to 55°.

3. A three-phase-enclosure type gas insulated switchgear as claimed in claim 1, wherein said metallic vessel is made of aluminum alloy, and the support angle of said single pedestal support insulator is about 90°.

* * * * *